United States Patent [19]

Gaspar

[11] 4,084,550
[45] Apr. 18, 1978

[54] ROTARY ENGINES

[76] Inventor: Peter Gaspar, 1567 Parker Ave., Fort Lee, N.J. 07024

[21] Appl. No.: 664,512

[22] Filed: Mar. 8, 1976

Related U.S. Application Data

[63] Continuation-in-part of Ser. No. 375,706, Jul. 2, 1973, abandoned.

[51] Int. Cl.[2] .................. F02B 55/14; F01C 1/00; F04C 17/00
[52] U.S. Cl. ...................... 123/245; 418/33; 418/36
[58] Field of Search .............. 123/8.47; 418/36, 33

[56] References Cited

U.S. PATENT DOCUMENTS

| 1,303,255 | 5/1919 | Carter | 123/8.47 |
| 1,973,397 | 9/1934 | Stromberg | 123/8.47 |

FOREIGN PATENT DOCUMENTS

| 1,965,865 | 5/1971 | Germany | 123/8.47 |
| 160,125 | 3/1921 | United Kingdom | 418/36 |
| 218,493 | 7/1924 | United Kingdom | 123/8.47 |

*Primary Examiner*—John J. Vrablik
*Attorney, Agent, or Firm*—William R. Liberman; H. Gordon Dyke

[57] ABSTRACT

Rotary engine has four pistons circling in a toroidal chamber formed inside a casing, successive pairs of cylinders accelerating and decelerating relative to each other. The pistons are carried on piston carriers that are generally figures of revolution. Portions of these piston carriers are joined by bevel gears through which both rotation and accompanying oscillation are enforced upon the piston carriers.

17 Claims, 11 Drawing Figures

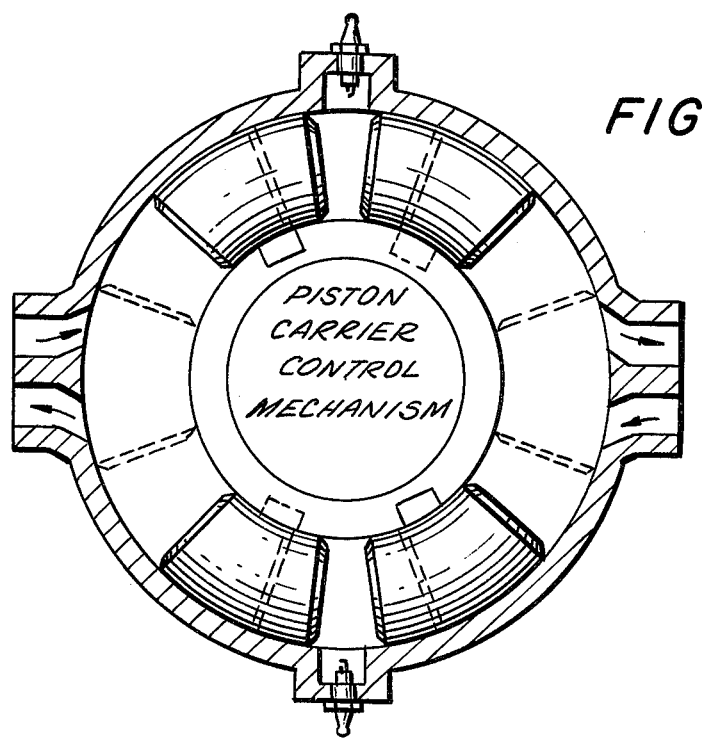
FIG.10
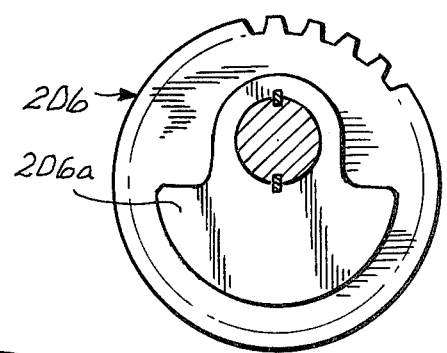
FIG.9
FIG.11
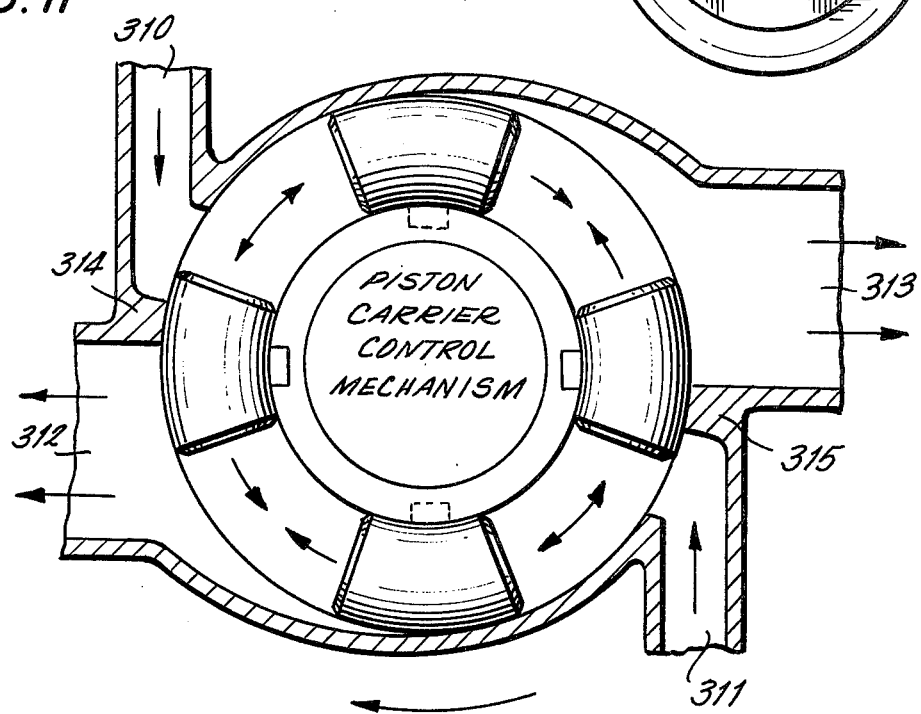

ROTARY ENGINES

This application is a continuation-in-part of my U.S. patent application Ser. No. 375,706 filed July 2, 1973, now abandoned.

This invention is a rotary engine wherein four pistons all revolve within a toroidal piston chamber, both of two pistons that are diammetrically opposite each other being mounted on one wheel-like piston carrier, and the other pair which are diammetrically opposite each other being mounted on a second wheel-like piston carrier.

The two piston carriers both revolve with a constant component of rotational velocity, and at least one piston carrier, and preferably both, also has a cyclically variable component of rotational velocity. Thus adjacent pistons alternately move apart and move closer to each other as they continuously rotate whereby repetition of the engine's cycle occurs.

The forces that alternately drive adjacent pistons apart or together are transformed through a motion transforming mechanism into forces that drive the constant rotation component of motion. Rotary engines of this general type are old in the art, in for example these U.S. patents:

| | | |
|---|---|---|
| 1,024,166 | 1912 | Weed |
| 1,497,481 | 1924 | Bullington |
| 1,676,211 | 1928 | Bullington |
| 1,729,242 | 1929 | Bregere |
| 2,061,131 | 1936 | Bancroft |
| 3,241,531 | 1966 | Bancroft |

The general nature of operation of engines of this sort is well known, for example from the foregoing patents, and therefore need not be set forth at length here.

Rotary motion has advantages over reciprocating motion, one of these being greater smoothness of action. Also parts that are figures of revolution can be easier and less expensive to build, can be designed to be lighter and smaller for a given power output, and can be developed to need less maintenance. The further fact that valves can be dispensed with and ports substituted in this type of engine is a further great advantage.

Despite the promising possibilities of engines of this sort, no one to the knowledge of this applicant has ever built one that was really successful. This applicant has focused upon a four-piston, four stroke cycle engine giving four power strokes per revolution, as a preferred embodiment. Simpler specifications than this tend to be inefficient or unreliable but can be suitable for some special uses. More elaborate specifications, including particularly eight-piston engines, tend to be more costly, harder to develop, and quicker to give trouble.

The casing of my engine is shaped to form within it an incomplete toroidal chamber concentric with and encircling the engine's central axial region. The part of the toroidal chamber not formed by the casing is preferably its portion nearest the engine's central axis (shaped about like presently conventional automobile tires.) The open portion of the toroidal chamber is enclosed by other structures notably the rim portions of the engine's two circular piston carriers.

In my invention the piston carriers are essentially figures of revolution and similar to wheels of any of various types including generally flat discs and dished rims, and they may have portions cut away. Each of my two piston carriers bears a pair of pistons, the individual pistons of the two pairs alternating in occurrence around the toroidal piston chamber. My toroidal piston chamber is concentric with the piston carriers, having common central axis with the engine as a whole.

For smoothness and maximum power it is necessary to have the phases of the pistons and other moving parts in the engine quite positively, precisely and uniformly related to each other. Moreover if looseness permits canting, or imbalance causes shaking, the parts can soon destroy each other and thereby the engine.

These requirements would seem to indicate inclusion of a main shaft extending uninterruptedly through from front to back of the engine. However it is not possible to so extend the shaft if a four-stroke-per-revolution engine is built employing a pinion gear inside an internally toothed ring gear concentric with the central axis of the engine to give the four strokes, because the pinion gear needs to be exactly half the pitch diameter of the ring gear (and of tip diameter somewhat more than half) whereby the pinion gear sweeps through all the central space that an axial main shaft would occupy. This problem has driven prior art inventors to a variety of expedients, none of them very successful. The present applicant has devised a novel and superior solution to these problems.

My motion-transforming mechanism occupies the center space of the torus and may project somewhat in either or both directions along the straight-line central axis of the torus or parallel thereto. Here a drum rotates with the main shaft, and contains parts that revolve with the drum and also rotate at twice its rate. The drum also has parts that revolve with the drum as a whole and additionally rock forward and back repetitively about the same axis of the drum, so they rotate at a cyclically varying rate.

My motion-transforming mechanism employs at least one large bevel gear of diameter $2x$ and at least one small bevel gear of diameter $x$ meshing therewith, two piston carriers of which at least one is oscillated by an eccentric pin on the small bevel gear carrying a slider which slides and rocks in a groove in the piston carrier. This mechanism causes at least one piston carrier to osscillate relative to the rotating main shaft of the engine. Preferably the oscillations are only relative as between the two piston carriers, their motion relative to the fixed parts of the engine being one of cyclically varying forward rotational velocity.

In the drawings,

FIGS. 2 and 3 are details showing certains forms of my eccentric pin and slider, FIG. 3 also showing a bevel gear which carries the eccentric pin, and a part of a piston carrier with end view of one form of the slideway that the slider rides in.

Figures 6, 7:
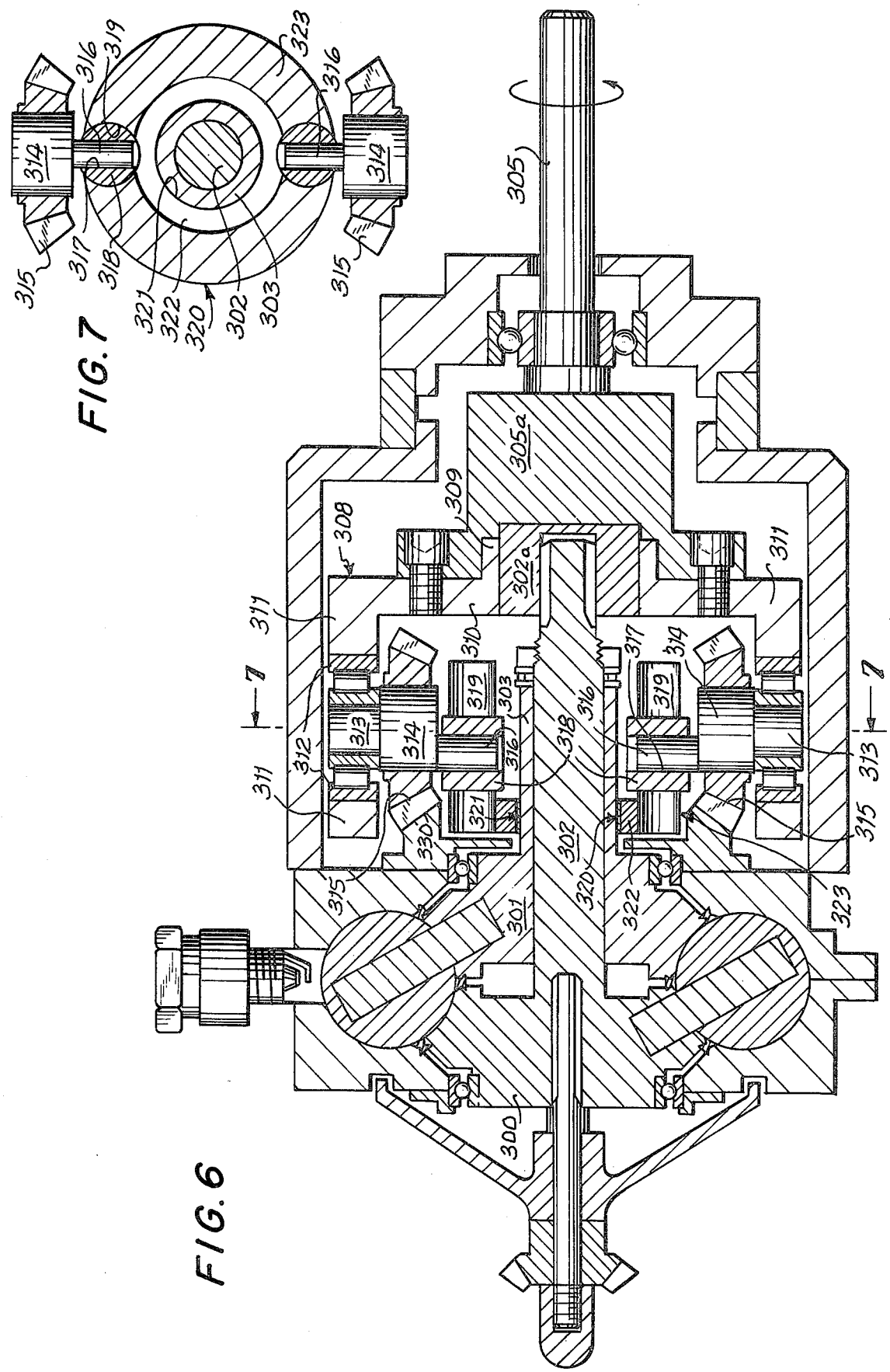

FIG. 6 is essentially a vertical longitudinal section of an engine that illustrates some of the modifications that can be made within my invention, including moving the control mechanism drum along the engine's axis to a location outside the center of the torus, having the eccentric pins on bevel gears axially outside the piston carrier they control, and having one piston carrier rotate at constant velocity, while the other rotates at cyclically variable velocity plus and minus a sine wave increment.

FIG. 7 is a cross-section taken on the line 7 — 7 of FIG. 6 showing the traveling bevel gears, pins they bear, and the cyclindrical wall which is mechanically integrated with the variable speed piston carrier, and giving an end view of the slideways cut in that wall.

Figure 8:
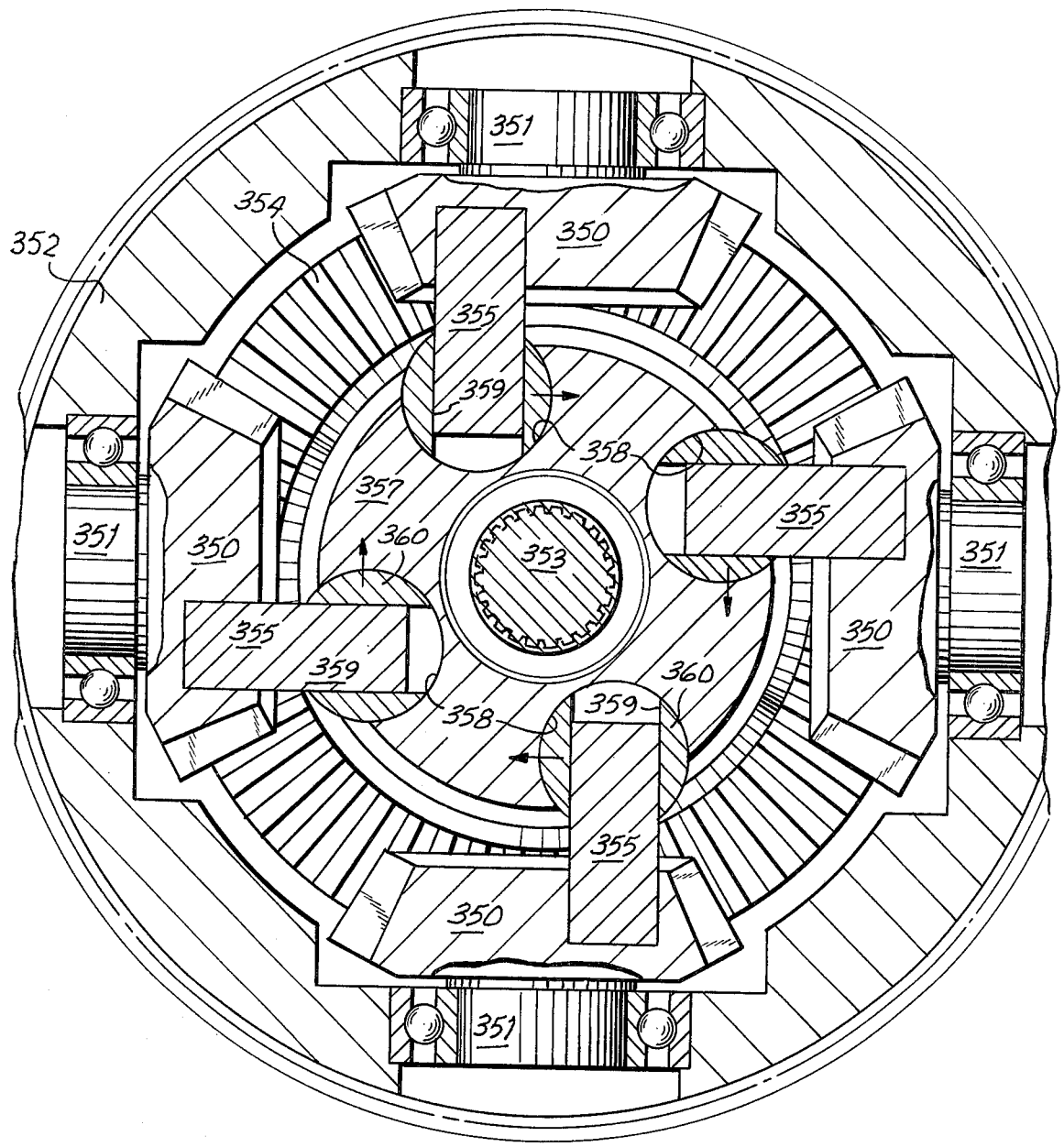

FIG. 8 is a cross section of control mechanism for a similar engine arrangement but showing four bevel gears with eccentric pins and four slideways and sliders, particularly suitable for a high power engine.

FIG. 9 is a view of the face of a traveling bevel gear as used in other figures hereof, particularly FIG. 8, indicating a way that the eccentric pins and the traveling bevel gears that bear them can be balanced entirely as to radial vectors and nearly as to axial vectors.

FIG. 10 illustrates diagrammatically the application of my control mechanism to a suitable piston chamber arrangement to constitute a two-stroke-cycle engine.

FIG. 11 illustrates diagrammatically the application of my control mechanism to a suitable piston chamber arrangement to constitute a pump or compressor.

Figure 1:
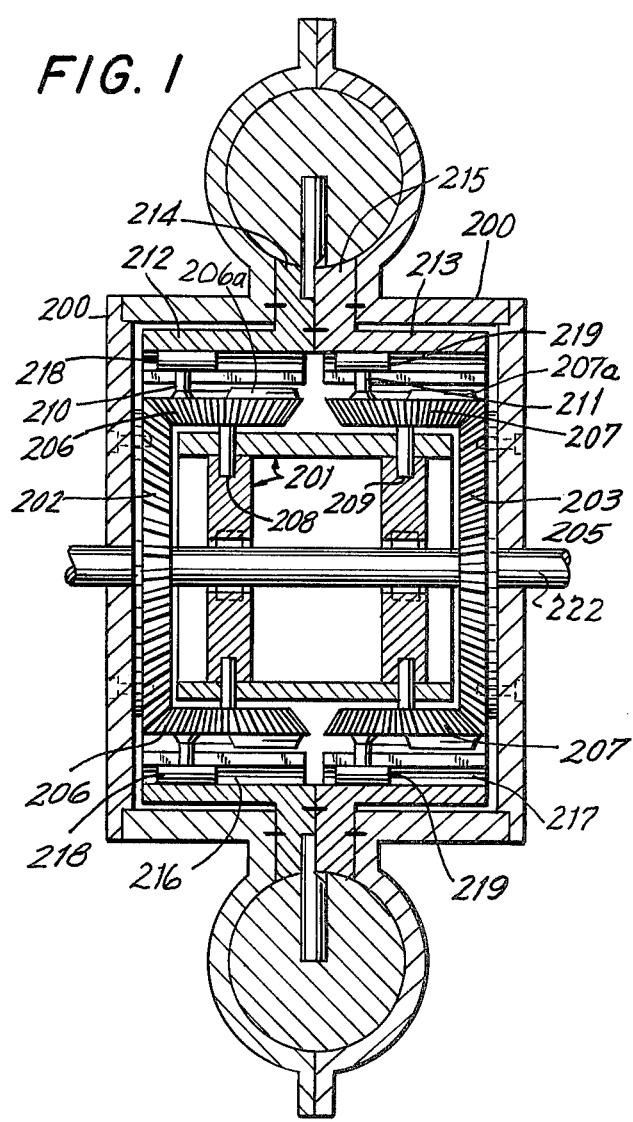
FIG. 1 is a vertical longitudinal section of an illustrative engine in accordance with my invention, whose precise shape and proportions are chosen more for ease of understanding than for engineering excellence.

In the form of my invention seen in FIG. 1, the main shaft 222, which extends through the casing 200, may be rotated for example so that as seen from the reader's right this end of the shaft rotates counterclockwise. The large bevel gears 202, 203 are perpendicular to the main shaft and concentric with it, but these large bevel gears are fixed to the casing and constitute fixed reactors. The two pairs of traveling bevel gears 206, 207 are perpendicular to those fixed bevel gears 202, 203 and mesh with them and therefore rotate as they are swept around by the rotating of the drum 201 affixed to the main shaft 222.

Figure 2:
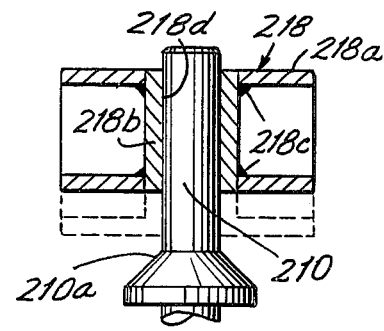
Figure 3:
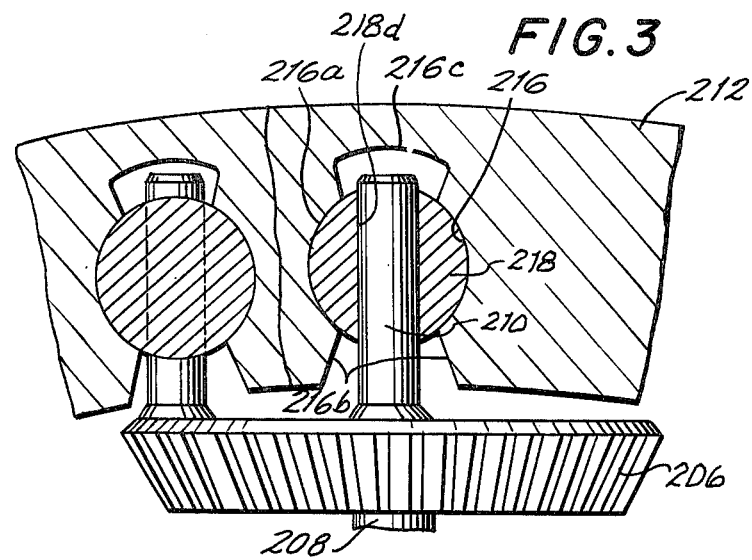

Each of the fixed reactor gears 202, 203 has twice as many teeth as each of the traveling bevel gears 206, 207 and the reactor gears are of twice their diameter. Therefore the eccentric pins 210, 211 on the outer faces of the traveling bevel gears revolve twice about the axes of the traveling bevel gears' journal pins 208, 209 with each revolution of the main shaft. FIG. 2 is an enlarged fragment showing pin 210 and slider 218. FIG. 3 is an enlarged fragment showing pin 210 and slider 218. FIG. 3 is an enlarged fragment, modified by a bay 216c, of the left shoulder portion of FIG. 1.

The eccentric pins 210 fit turnably and slidably through a bore 218d in the sliders 218, 219. These sliders are short circular cylinders, which may be solid (except for the bore) or hollow.

The bands 212, 213 which together with their flanges 214, 215 constitute the two piston carriers, have crosswise slots formed in their inner faces. These slots 216, 217 are generally cylindrical, open with less than their maximum width on the band face toward the traveling bevel gears, and may have bays 216c and/or flaring mouths 216b if needed to go with the size and shape pins chosen. The bevel gears 206, 207 may have enlarged parts as at 206a, 207a, serving as counterweights to balance the pins and sliders. Such weighting is shown in FIG. 9.

The above construction gives an engine wherein any two adjacent pistons came together twice and move apart twice for each travel of any piston 360° around in the toroidal piston chamber, whereby these control mechanisms can be utilized in not only a four-stroke-cycle engine but also a two-stroke-cycle engine, a compressor, or a pump.

Figure 4:
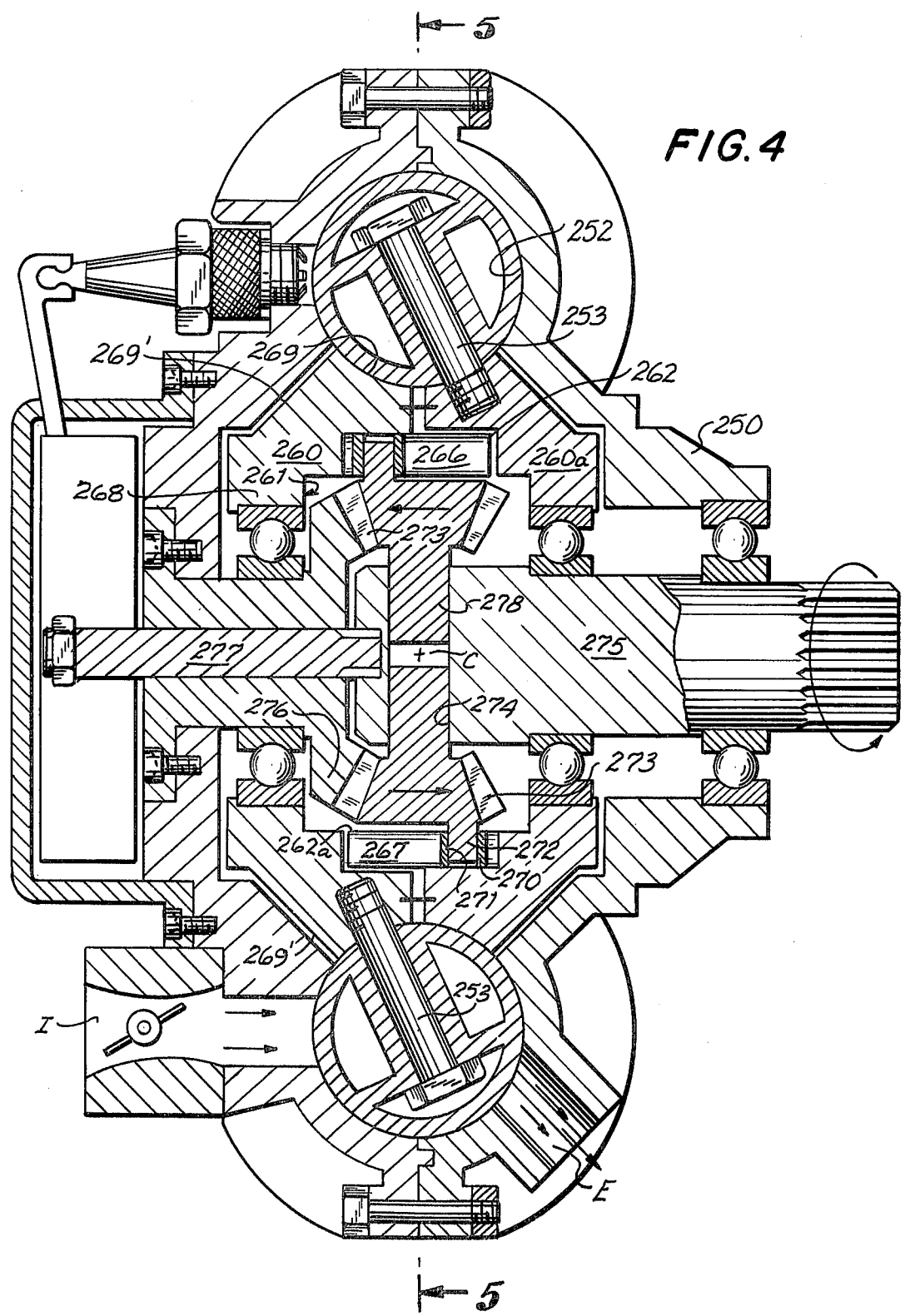
FIG. 4 is a vertical longitudinal section of one design of my invention essentially as taken on the line 4 — 4 of FIG. 5, subject to some jogs from that line for clearer illustration.
Figure 5:
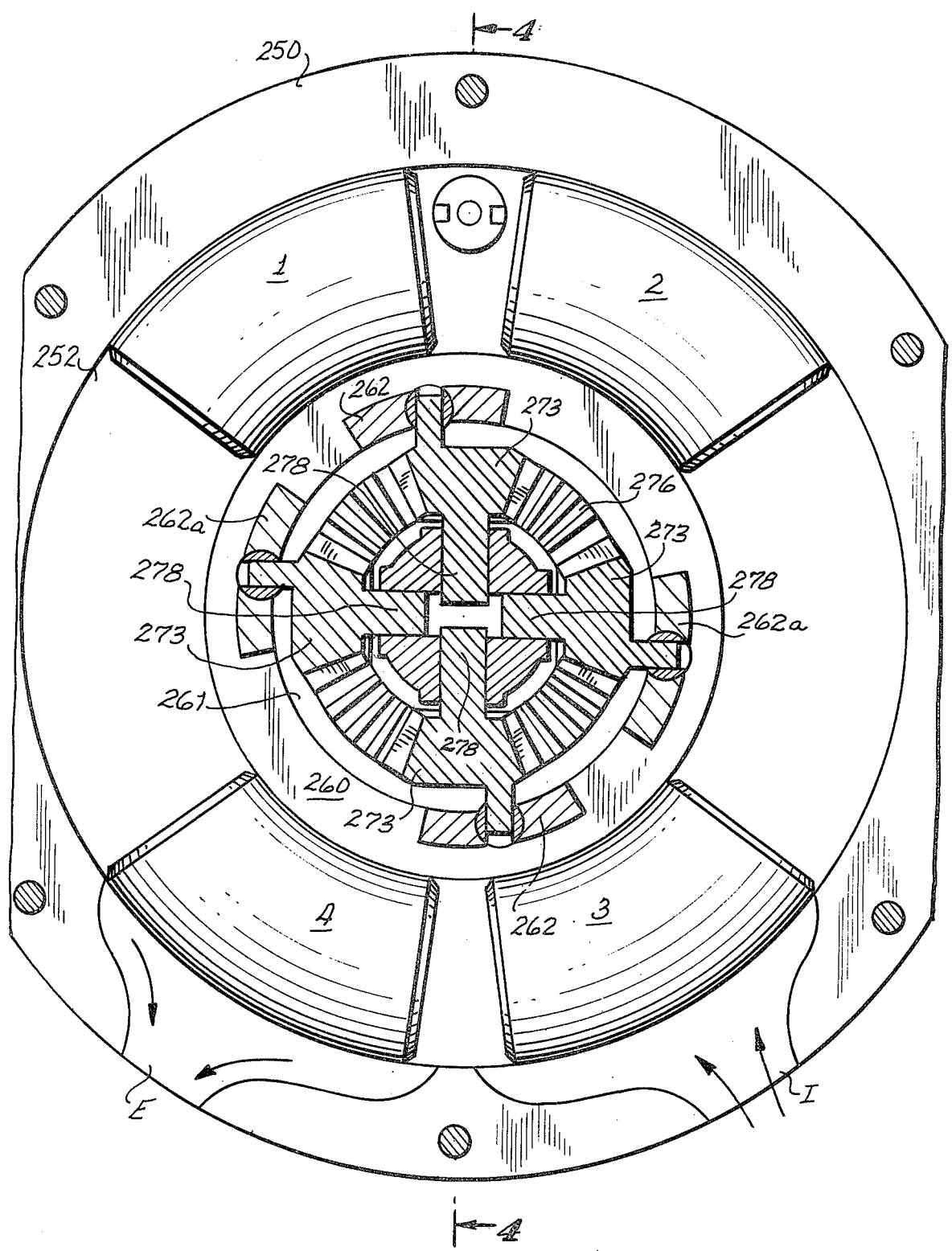
FIG. 5 is a vertical lateral view of a construction in essence like that of FIG. 4, and generally as though taken on the line 5 — 5 of FIG. 4.

FIGS. 4 and 5 represent an engine similar in fundamentals to the engine shown in FIG. 1.

Here a casing 250 forms inter alia a toroidal piston chamber 252 in which two pairs of pistons 1, 3 and 2, 4 fit and travel. Two piston carriers 260, 260a form the inner portions of the toroidal chamber wall. These piston carriers each carry two pistons, 1, 3 and 2, 4 which are 180° apart. Bolts 253 in the largely hollow interiors of the pistons secure same to the the piston carriers.

The piston carriers 260 and 260a are the same or nearly so, serve as internal rotors, and visually resemble thick, somewhat complex, wheels or rims. Initially describing the piston carrier in terms of a loose individual part, it has side walls 269 and 269', and rests on a flat round bottom surface which has a large central hole cut out. Inside the bowl, its floor is an inward annular land 268, whose floor surface 261 is flat. Arising from surface 261 is the circular surface of a larger cylindrical open space. At the edges of this opening, round bores 226, to serve as slideways, are drilled down from the back, extending about half way to the front. These bores intersect the large cylindrical open space and so have open side faces.

A further kind of inside cut is made. This cut is concentric with the others, extends out most the thickness of the bores, extends down about half the extent of the bores, and in azimuth is discontinuous; two occurrences are made for each piston carrier, diametrically opposite each other between the bores, each cut extending for substantially more than 90° and less than 180° and ending preferably equispaced from the bores 226, 267. Thus they leave upstanding merlons, one pair designated as 262 and another pair designated as 262a. The bores 266, 267 respectively constitute slideways and receive short cylindrical sliders 270 which in turn are pierced with transverse bores 271 for the eccentric head pins 272 of the smaller, traveling bevel gears 273 to extend into. The radially outer surface of this piston carrier has one square corner annular cut made in from that surface to somewhat intersect the slideway bores, this cut extending from the piston carrier's back surface for about a quarter to a third the thickness of the piston carrier, preferably coinciding in this dimension with the azimuthally discontinuous cut that was made radially outward from the large central open space. The remainder of the radially outer surface of the piston carrier is formed, first around its central portion as at 269 to fit with the casing to partially complete the enclosing wall of the toroidal chamber, then the remaining part from there to the front is turned down as at 269' to fit suitably witin the engine casing.

Now make a duplicate 260a of the piston carrier described just above. Place the two piston carriers with their tops facing each other, and with their merlons 262 and 262a interdigitated. It will be seen that of course both can be rotated together and that moreover they can both oscillate, either; one relative to the other which can remain constant; or both simultaneously in opposite directions. These are then the prepared piston carriers of FIGS. 4 and 5 of the drawings hereof.

Into the cylindrical bores that constitute slideways 266, 267 fit short cylinders 270 with transverse bore 271. Into these latter bores fit pins 272 which are radial relative to the engine's axis and which are mounted eccentrically on and axially parallel with traveling bevel gears 273. These bevel gears are journaled in transverse bores 274 in main shaft 275, and they mesh with fixed bevel gear 276 whose flange portion is perpendicular to and concentric with the main shaft, which may be and here is extended out the opposite end of the engine by a length of smaller shaft 277 splined to it.

The various bevel gears should all have a common center c at the axis of main shaft 275 and the axes of the journal stems 278 of the traveling bevel gears 273.

In FIG. 4 the main shaft turns counterclockwise as viewed from the reader's right. Thus the upper traveling gear is bodily coming toward the reader, with its left side held back by the reactor gear. This means that the top bevel gear turns clockwise as viewed from above. Its eccentric pin and associated slider move the piston carrier 260 so its upper part in FIG. 4 moves toward the reader, but at a varying rotational rate which is essentially the constant rate of main shaft 275 plus an additional component from the eccentricity of pin 272 which has a two-cycle variation, from approximately zero to a maximum and back to near zero and up to the maximum and back down, this two-cycle pattern occurring with each revolution of the main shaft. FIG. 5 shows the engine when the top and bottom parts have advanced 90° from the locations of FIG. 4; also the cut of FIG. 5 that FIG. 4 is taken on will do some angling as it goes through the central control mechanism, to give center sections of parts. This angling is omitted in the drawing to avoid clutter.

The rear (right in FIG. 4) piston carrier 260a has two merlons 262a which interdigitate a similar pair of merlons 262 on the front carrier 260, with angular space between adjacent merlons. In FIG. 5 we see both pairs of merlons because they cross the center plane. All four eccentric pins are—for their information value—shown in FIG. 5 though two had to be projected across the section cut line. Note that the pistons do not have to be attached to the piston carrier directly opposite the slideways; however the relations should be constant, i.e. all the pistons should be spaced quadrantally when all the slideways are spaced quadrantally.

Exhaust and intake ports (valves not being needed) are indicated in the toroidal piston chamber of FIGS. 4 and 5 as intake I and exhaust E respectively.

Some extra mass may be provided on the same faces of the traveling bevel gears as bear the eccentric pins. The proportions here may be modified to whatever degree balances the pins, for smoothness of operation. The traveling gears bodily are balanced by being in pairs opossite each other, and the same is true of the pistons. Each piston carrier is itself balanced with equal opposite parts, and the rotational velocity variations of the pistons and piston carriers as a whole are equal and opposite and hence can rather closely approach perfect balance.

Of course when starting (or when using as a pump or compressor) external power is applied to turn the main shaft, and it drives the control mechanism and thereby cycles the pistons. When the engine runs as a power generator it is the forces applied between two adjacent pistons at the location for their power stroke that drives the two adjacent pistons apart and thereby drives the control mechanism and through it the main shaft.

In FIGS. 1 through 5 the control members are located in the center space of the torus and are in general symmetrical across a transverse plane of the engine.

FIGS. 6, 7 and 8 illustrate other arrangement features that may be utilized within the present invention.

As seen in FIG. 6, the piston carriers may remain in the center space of the torus but their control mechanism be located in a chamber alongside the torus and centered on the common axis therewith.

Moreover, one pair of pistons may keep constant rotational velocity while the other pair perform the excursions to give essentially the same cycle.

Both these features are shown in FIG. 6. Here there are two piston carriers 300, 301, each carrying a pair of diametrically opposite pistons as in FIG. 5. One piston carrier 301 has at its center a hollow tubular extension 303. Inside this, and rotatable relative thereto, is axial extension 302 from piston carrier 300. This extension connects through certain structures with the engine's main shaft 305 which extends out through the casing at the right in FIG. 6. The intermediate structure bears control mechanism.

There are three portions of this intermediate structure. Inter alia, these contribute to flywheel effect, and to solidity of these united parts, and they facilitate assembly and disassembly. The joining parts are two somewhat cup-like members, the left one 302a capping the end of the inner shaft member 302, and the right one, 305a, capping the end of the main shaft 305. These two members of the intermediate structure nest into each other, and also receive in nesting fashion a somewhat central portion of a large cup member 308 which is secured to the above-mentioned intermediate structure. That member 308, and members 302a and 305a are all secured against rotation relative to either shaft part 302 or main shaft 305, and in this embodiment all five of these parts are secured together so they are mechanically integrated. This large cup member 308 is concentric with the engine's main axis, and comprises an inner sleeve portion 309 near the axis, a disk portion 310 extending radially outward therefrom, and an outer sleeve (cylindrical shell) portion 311. This outer sleeve portion extends from the disk portion in the direction toward the toroidal piston chamber.

In this outer sleeve portion 311 round openings 312 are cut, each going through the sleeve 311 in a radial direction and suitably journaling a concentric stub shaft 313 that extends radially (relative to the engine's main axis) outward from a generally circular body 314 mechanically integrated into a bevel gear 315 which has x teeth. At the inward flat face (of the body 314) a cylindrical eccentric pin, or stub shaft, 316 extends inward parallel to the axes of the stub shaft 313 and the body 314.

The upper bevel gear 315 and its duplicate 180° down from it and similarly designated as 315, engage a fixed bevel gear 330 perpendicular to and concentric with the engine's main axis and centered at that axis. Fixed gear 330 is located at that side of the smaller traveling bevel gears which is nearer the torus, is mounted directly or indirectly on the engine casing, and has 2x teeth and correspondingly twice the diameter of the smaller bevel gears. The teeth of both this large fixed bevel gear and those of the small traveling bevel gears are aligned with the intersection of the axes of the large fixed bevel gear and of the plurality of small bevel gears.

The eccentric pin 316 fits closely but movably into a cross-bore 317 formed in and perpendicular to the axis of a short cylindrical slider 318. The axis of cylindrical slider 318 is parallel to the main axis. This slider is received into a corresponding slideway 319 which is parallel to the engine's axis, which latter coincides with the axis of shaft 305. This slideway 319 is bored in the sleeve wall of another cup member 320 which is mechanically integrated with the piston carrier 301's hollow tubular extension 303. The bottom of this cup 320 has a central holes 321 for the piston carrier extensions to pass through, a disc bottom 322 radiating outward from the central hole, and then a sleeve 323 which is a circular cylindrical shell and which is concentric with the engine's main axis.

It will be observed that by this arrangement the front piston carrier 300 and the main shaft 305 (together with the parts along the engine axis that join them) are solidly linked together. Hence they rotate in unison. In this same rotational system the outer sleeve 311, which has the maximum diameter of the various control mechanism parts, and the intermediate caps 302a and 305a, impart to each other and to the main shaft 305 a constancy of motion, enhanced by whatever rotary load is attached to the main shaft 305. Thus the other piston carrier—the rear one, 301—and parts that rotate with it, having much lower moment of inertia, can react on the one hand against the fixed case, and on the other hand against the high summation of moment of inertia of the rotary system that piston carrier 300 is part of, so that rotary motion of piston carrier 301 undergoes a cyclic retardation then acceleration repeated at the rate of four strokes per revolution of the engine.

This cyclic change in rotational velocity is imparted by the control system, notably the parts numbered 308 through 323. Specifically the rotary system with eccentric pin 316 is caused, by rotation of the bevel gear 315, as it is swept around fixed bevel gear 330, to make two full rotations as the engine performs one revolution. This is felt by the rear piston carrier 301 and the pistons that it carries, as four successive strokes—back and ahead, back and ahead—superimposed upon the constant rotation common to both piston carriers.

The sleeve 323 extends toward the rear, inside the constant rotational velocity cup 308, the sleeve 323 being radially enough smaller than the sleeve 311 so that small bevel gear and associated body 314 can be radially interposed between the sleeves, and the projecting stub shaft 313 can extend into the opening 312 in sleeve 311 and the eccentric pin 316 can extend into the slider bore 317 that goes through the slider 318 which extends through the sleeve 323.

FIG. 7, taken on the central part of line 7 — 7 of FIG. 6, shows (from center out) the rearward solid extension 302 of front piston carrier 300, the rearward tubular extension 303 of rear piston carrier 301, the sleeve 323 of cup 320 mounted on part 303, the slideways 319 bored in the sleeve 323, the short cylindrical sliders 316 fitting therein, the cross-bore 317 in the slider, eccentric pin 316 fitting therein, body 314 for holding eccentric pin 316, and small bevel gear 315. Since FIG. 7 is taken in a direction perpendicular to FIG. 6 the pins 316 shown as eccentric in FIG. 6 do not reveal their eccentricity in FIG. 7.

The engine represented in FIGS. 6 and 7 can work after a fashion with one small bevel gear, can work satisfactorily with two as shown, and can work more powerfully and more smoothly with four as illustrated in FIG. 8. This control mechanism uses as before one fixed bevel gear of twice the diameter and twice the number of teeth of each of the smaller traveling bevel gears. Note that all four bevel gears are to be assembled with their eccentric pins in the same phase, and that phase should match the phase the variable velocity piston carrier is in relative to the constant velocity piston carrier. "Constant velocity" herein of course means constant while external parameters stay uniform.

FIG. 8 is generally like FIG. 7, in that output shaft 353 will be connected to the sleeve 352 which journals the several traveling bevel gears in it by pins 351 concentric to those bevel gears 350. That sleeve 352 will rotate at constant rate as the bevel gears 350 run constantly around the larger fixed bevel gear 354.

Traveling bevel gears 350 also carry pins 355 in them, mounted parallel to the gear's axis but eccentric. Those pins 355 slide in and out in bores 359 formed in cylindrical sliders 360. Those sliders can both rock and slide in cylindrical slideways 358 bored in inner sleeve 357, both these actions being necessary to accomodate the relative motions of the parts.

This control mechanism thus sets up mechanical relations that require that if the outer sleeve is driven at a constant rate the inner sleeve will run at a rate which comprises that same constant rate but plus and minus oscillations superimposed thereon at two cycles per sleeve rotation.

Thus the system obligates the desired relative motion and accomodates other motions that are incidental but not in and for themselves desired.

The drawings inherently reveal which parts travel at what relative rotational rates. This is made more explicit and quicker however by the following tabulation.

| FIGS. 1 – 3 | FIGS. 4,5 | FIGS. 6,7 | FIG. 8 |
|---|---|---|---|
| Some parts rotating at output rate. | | | |
| 222 | 275 | 300 | 352 |
| 201 | 277 | 302 | 353 |
| | | 302a | |
| | | 305 | |
| | | 305a | |
| | | 308 | |
| Some parts rotating at twice the rpm's of output rate. | | | |
| 206 | 273 | 313 | 350 (4 of) |
| 207 | 278 | 314 | |
| | | 315 | |
| Some parts rotating at output rate plus and minus oscillations at two cycles per output rotation. | | | |
| 212 | 260 | 316 | 355 |
| 213 | 260a | 318 | 357 |
| | | 320 | |

Different engine constructions are in varying degrees capable of being balanced. Where high speed and long life are desired, as is true of most engines today, an engine needs to have good balance for each one of its various motion systems and subsystems. The nature and arrangements of my engine make it capable of being rather finely balanced as to its individual motion systems and as to its composite rotating assembly.

FIG. 9 is a face view of one feature I use for individual traveling bevel gears to balance the eccentric pin and slider. Here most of the face of the gear 206 diametrically opposite the eccentric pin has been thickened as at 206a to give it extra weight counterbalancing the eccentric pin and slider. This extra thickness may continue more narrowly around the foot of the eccentric pin so the pin is reinforced where possibility of fatigue cracking would otherwise be localized. This is visible in FIG. 1.

A toroidal cylinder with four pistons fitting in it on two piston carriers having control mechanism in accordance with my teaching can be combined with a variety of inlets and outlets, a variety of means for introducing fuel and for igniting it or for applying energy to be utilized or transformed, with a variety of means for taking power from my invention either utilizing a projecting rotating shaft or utilizing various other power take-off expedients. The variations in all these parameters do not reach the heart and substance of my invention which lies in the combination of toroidal (or substantially toroidal) piston chamber, four pistons therein, associated casing and piston carriers and my control mechanism mechanically related as claimed herein.

FIGS. 10 and 11 show two such examples out of many. FIG. 10 indicates my control mechanism as taught in other views of my drawings applied to four pistons in accordance with my invention in a toroidal piston chamber arranged for two-stroke-cycle operation. Here power is gained at the expense of efficiency. FIG. 11 indicates my control mechanism applied to four pistons in a generally toroidal piston chamber arranged to serve as a pump or compressor.

I claim:

1. An apparatus having a main rotary axis, said apparatus including a hollow casing so shaped that parts of its surfaces define within them a substantial part of a hollow toroidal piston cylinder whose central axis is the main rotary axis of the apparatus, and two rotatable piston carriers which have generally circular rim portions and which are concentric with the hollow toroidal piston cylinder at the main rotary axis and form portions of said cylinder's enclosing surfaces, each of those piston carriers mounting along its periphery a pair of diametrically opposite pistons, which fit within the said cylinder, with pistons of the two pairs alternating in circumferential occurrence within that cylinder, a central rotary member mounted at least indirectly on said casing with its axis at the main rotary axis, drum structure carried by said central rotary member for rotation therewith, at least one traveling bevel gear carried by said drum structure, with each such traveling bevel gear having its own axis of rotation angled significantly away from parallelism with the main rotary axis, at least one fixed bevel gear fixedly mounted in relation to the casing and coaxial with the main rotary axis, each traveling bevel gear being so mounted on the drum that it meshes with the fixed bevel gear, each fixed bevel gear having twice the pitch diameter and number of teeth of each traveling bevel gear, such that when the central rotary member rotates, each traveling bevel gear rolls around the fixed bevel gears it meshes with and in the course of doing so rotates twice about its own axis, each such traveling bevel gear being linked eccentrically of itself to a piston carrier to connect that piston carrier to that traveling bevel gear and cause the traveling bevel gear's eccentric linkage point and the piston carrier to travel rotatively about the main axis in unison at a rate that has one component from the rotation of the central rotary member and another component from the rotary excursions of the eccentric point around the axis of its traveling bevel gear whereby as the central rotary member makes one rotation a piston carrier makes two rotations with four strokes superimposed thereon.

2. Apparatus of claim 1 in which one piston carrier is rotationally tied to an output rotor to rotate with it at constant rotary velocity, while the other piston carrier has mechanically integrated with it four slideways parallel to the axis of the output rotor, cylindrical sliders fitting turnably in the four slideways, and the output rotor has mechanically integrated to it and parallel to it a cup having four bevel gears journaled therein with the axes offset from the axis of the output rotor, and these bevel gears bearing each an eccentric pin, all phased alike, these pins being rotatably and slidably positioned within crossbores in the sliders.

3. Apparatus of claim 1 which, operating as an engine, has exactly four pistons, a four-stroke cycle, and four power strokes per revolution.

4. Apparatus of claim 1 which, operating as an engine, has exactly four pistons, a two-stroke cycle, and eight power strokes per revolution.

5. Apparatus as specified in claim 1 constructed as a pump.

6. Apparatus as specified in claim 1 constructed as a compressor.

7. Apparatus of claim 1 in which there is only one fixed bevel gear and only one piston carrier that oscillates as it rotates, the second piston carrier of the apparatus being tied to the central rotary member and making one revolution as the central rotary member makes one revolution.

8. Apparatus of claim 1 in which the eccentric link is a pin, the piston carrier has a slideway generally parallel to the main rotary axis, the pin revolves in the slideway of the piston carrier and thus forces the piston carrier to have an oscillatory component combined with the constant component which it derives from the constant circular sweeping of the traveling bevel gear.

9. Apparatus of claim 8 in which the slideway is cylindrical with its slot forming a mouth, its mouth wider than the pin, and its maximum width is greater than the width of its mouth.

10. Apparatus of claim 9 in which the pin is cylindrical and a short cylindrical slider with a cross bore is provided, the slider fitting into the slideway and the pin fitting into the slider's cross bore.

11. Apparatus of claim 1 in which just one piston carrier is linked eccentrically through at least one traveling bevel gear to the fixed bevel gear and so rotates once with one rotation of the central rotary member and has four strokes per revolution superimposed thereon and the other piston is secured to the central rotary member so it rotates with same and makes one complete turn at an essentially constant rate for every one revolution of the central rotary member.

12. Apparatus of claim 11 in which the one fixed bevel gear, and the one piston carrier arranged to oscillate when it rotates, are tied through one traveling bevel gear.

13. Apparatus of claim 11 in which the one fixed bevel gear and the one piston carrier arranged to oscillate when it rotates, are tied to move in fixed relation to each other through a number of traveling gears, said number being an integer.

14. Apparatus of claim 1 in which there are two fixed gears, the two piston carriers each have at least one traveling bevel gear eccentrically tied to it and circling one of the fixed bevel gears in mesh with same, there being one fixed gear and at least one traveling gear tied to one only piston carrier, and different gears tied to the other piston carrier only, both piston carriers making four strokes of oscillation as well as one complete rotation when the central rotary member makes one revolution.

15. Apparatus of claim 14 in which there are two fixed bevel gears, both piston carriers oscillate as well as rotate, separate traveling bevel gears being mounted on the drum at the space around the main rotary axis, each meshing with a separate one of the fixed bevel gears, and each having its separate eccentric connection with a separate one of the piston carriers.

16. Apparatus of claim 14 in which there are two traveling bevel gears, and two more meshing with the other fixed bevel gear, the first two being eccentrically connected with one rotary/oscillatory piston carrier and the second two connected with the other piston carrier.

17. Apparatus of claim 14 in which a number of traveling bevel gears are interposed between one of the two fixed bevel gears and one of the two piston carriers, and similarly a number of traveling bevel gears between the other fixed bevel gear and the other piston carrier, the numbers in both cases being integers.

* * * * *